United States Patent
Hodgson

[11] 3,886,845
[45] June 3, 1975

[54] GEAR FINISHING MACHINES

[75] Inventor: Brian Hodgson, Rowlands Gill, England

[73] Assignee: Machine Tool Divisional Services Limited, England

[22] Filed: June 8, 1973

[21] Appl. No.: 368,446

[30] Foreign Application Priority Data
June 9, 1972  United Kingdom............ 27101/72

[52] U.S. Cl. ............... 90/1.6; 72/102; 90/58 A
[51] Int. Cl............................................. B23f 19/08
[58] Field of Search ......... 90/1.6, 58 A; 72/94, 102, 72/248

[56] References Cited
UNITED STATES PATENTS
3,115,064   12/1963   Rogg................................ 90/1.6
3,240,123   3/1966   Hurth et al. ...................... 90/1.6

*Primary Examiner*—Andrew R. Juhasz
*Assistant Examiner*—Z. R. Bilinsky
*Attorney, Agent, or Firm*—Watson, Cole, Grindle & Watson

[57] ABSTRACT

A gear finishing machine comprising a tool gear, means for supporting a workpiece so that it may be run in mesh with the tool gear, means for imparting rotation to one of said meshing members, means for imparting radial infeed to one of said meshing members, means for subjecting one of said meshing members to a hydraulic pressure urging it towards the other meshing member and means for relieving the hydraulic pressure to permit the hydraulically loaded member to move away from the other meshing member when the load on the tool gear exceeds a predetermined value.

4 Claims, 2 Drawing Figures

GEAR FINISHING MACHINES

BACKGROUND OF THE INVENTION

In gear finishing machines, such for example as a gear shaving machine or gear rolling machine, it is known to run the tool, which is in the form of a gear, in mesh with the workpiece without backlash by imparting radial feed to one of the members, e.g., the workpiece, to keep it in tight mesh with the mating member, for example by moving it and its support by a screw. This "tight mesh" condition may be ensured by the provision of means for measuring the distance between the axes of the tool gear and of the workpiece and automatically terminating the infeed of the moving member when this distance attains a preset value.

In a machine working on this principle, it is possible that overloading of the tool gear may occur, for example when the workpiece inserted into the machine has teeth thicker than intended. This overloading may cause damage to the tool gear, which is an expensive item.

SUMMARY OF THE INVENTION

With a view to obviating this difficulty the invention provides a gear finishing machine comprising a tool gear, means for supporting a workpiece so that it may be run in mesh with the tool gear, means for imparting rotation to one of the meshing members, means for imparting radial infeed to one of the meshing members, means for subjecting one of the meshing members to a hydraulic pressure urging it towards the other meshing member and means for relieving the hydraulic pressure to permit the hydraulically loaded member to move away from the other meshing member when the load on the tool gear exceeds a predetermined value.

BRIEF DESCRIPTION OF THE DRAWINGS

The invention will now be described in more detail, by way of example, with reference to an embodiment illustrated in the accompanying drawings, in which.

DESCRIPTION OF THE PREFERRED EMBODIMENT

Figure 2:
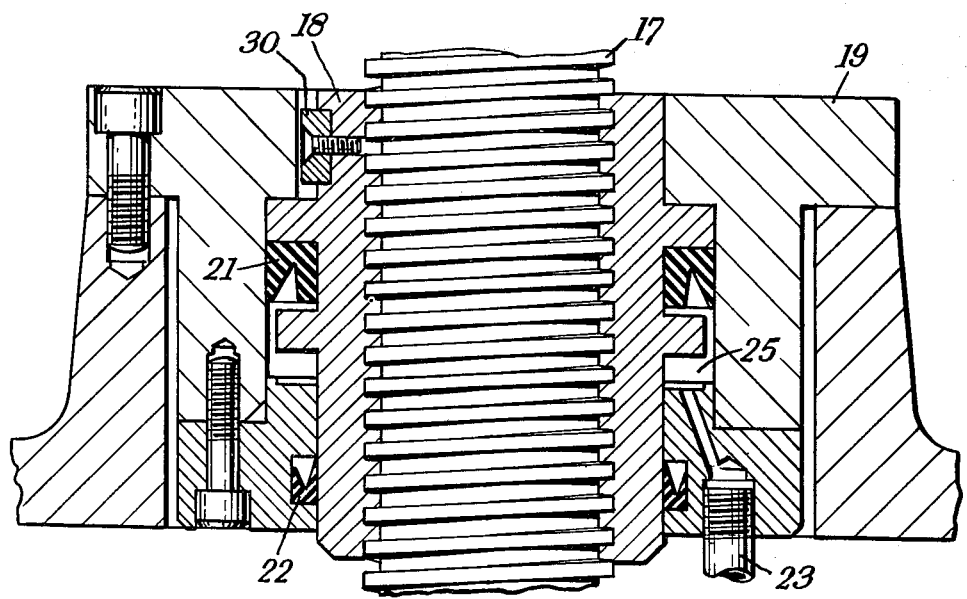
FIG. 2 is a sectional view on a larger scale through the mechanism for applying radial feed to the workpiece.

The machine illustrated includes a column 10 carrying a slideway 11 on which a knee 20 is vertically slideable. This knee carries a work supporting table 12, carrying head and tailstocks 13 which support a workpiece 14. A tool gear 15, rotatable through gearing by an electric motor 16, is disposed above the workpiece 14. The knee 20 is supported on a screw 17 engaging a nut 18 (FIG. 2). This nut 18 is disposed within a housing 19 in the base portion of the C frame machine column 10 and is held against rotation by a key 30.

In operation, the workpiece 14 is lifted into mesh with the tool gear 15 by rotating the screw 17 by conventional mechanism within the knee 20 which thereafter imparts a predetermined radial upward feed to the workpiece 14.

Figure 1:
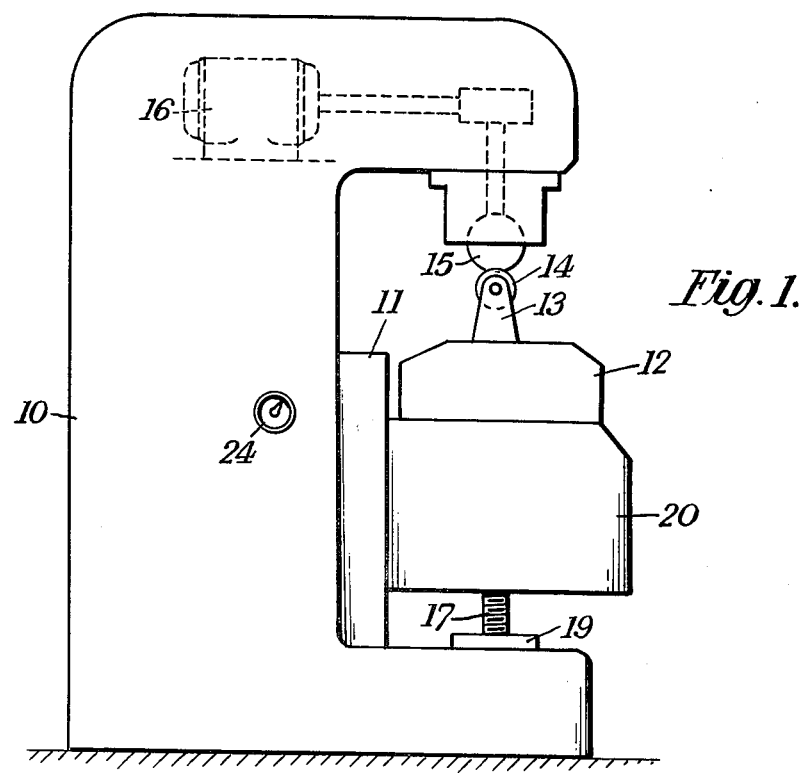
FIG. 1 is a side elevation of a gear finishing machine.

As shown in FIG. 2, the nut 18, which is movable as a piston in a cylinder 25 in the nut housing 19, carries sealing washers 21, 22 and is normally urged upwards to the position shown by hydraulic pressure applied through a pipe 23 to the undersurface of the washer 21. The hydraulic pressure is so selected that the upward thrust on the nut 18 is equal to the overall weight of the table 12, the screw 17 and the workpiece 14, plus the allowable load on the tool gear 15. If the allowable load on the tool gear 15 is exceeded during the gear finishing operation the nut 18 is pushed downwards, against the hydraulic pressure, carrying the screw 17 with it and thus damage to the tool is avoided. The hydraulic pressure is relieved, in the event of overload, by a relief valve 24 (FIG. 1). This is incorporated in a pressure reducing valve which sets the hydraulic pressure in the cylinder 25 to the required value. Alternatively a separate relief valve may be used. In either event, the relief valve 24 will open when the pressure in the cylinder 25 rises above the normal supply pressure. The pressure reducing valve permits variation of the hydraulic supply pressure to suit any particular allowable load on the tool.

As an alternative, the workpiece 14 and the tool gear 15 may be mounted on vertical axes, in which case the hydraulic loading pressure will be equal to the allowable load on the tool gear 15.

I claim:

1. A gear finishing machine comprising a tool gear, means for supporting a workpiece so that it may be run in mesh with the tool gear, means for imparting rotation to one of said meshing members, means for imparting radial infeed to one of said meshing members thereby generating a load on said tool gear, said infeed means including a non-rotatable nut and a screw engaging said nut and being rotatable so as to impart radial feed to said one meshing member, means for subjecting said nut to a back-up hydraulic pressure to resist said load, said screw being free from hydraulic pressure, and means for relieving the hydraulic pressure to permit said screw to move away from the other meshing member when the load on the tool gear exceeds a predetermined value.

2. A machine as claimed in claim 1, wherein said nut is movable as a piston in a cylinder to which the hydraulic pressure is applied.

3. A machine as claimed in claim 1, which includes a relief valve, incorporated in a pressure reducing valve, for relieving the hydraulic pressure.

4. A machine as claimed in claim 2, in which the screw is operative to apply radial infeed to the workpiece.

* * * * *